Sept. 16, 1941.   C. L. HALL   2,255,971

FASTENER SECURED INSTALLATION

Filed June 8, 1939

Inventor:
Charles L. Hall.
By John Todd
Att'y.

Patented Sept. 16, 1941

2,255,971

UNITED STATES PATENT OFFICE 2,255,971

FASTENER SECURED INSTALLATION

Charles L. Hall, Detroit, Mich., assignor to United-Carr Fastener Corporation, Cambridge, Mass., a corporation of Massachusetts Application June 8, 1939, Serial No. 278,072

1 Claim. (Cl. 16—2)

This invention relates to improvements in fastener installations.

Referring to the drawing, in which I have illustrated a preferred embodiment of my invention:

Figure 1:
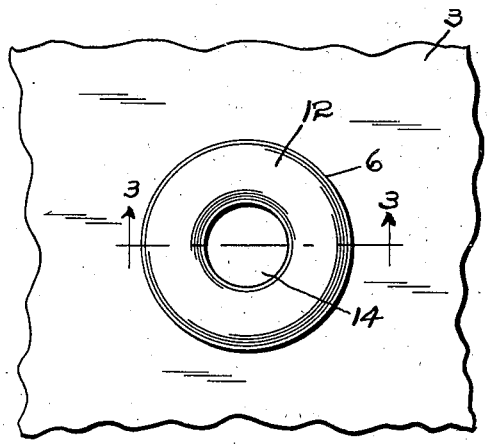
Fig. 1 is a front plan view of my preferred form of fastener installation.
Figure 2:
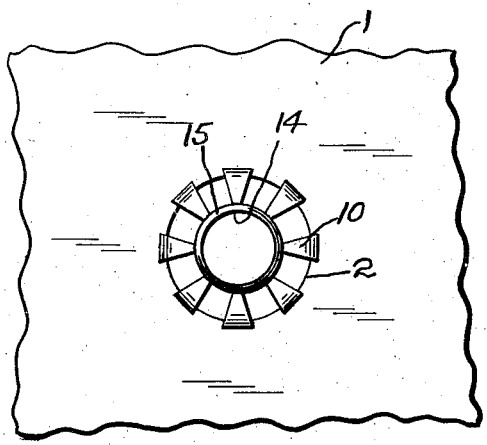
Fig. 2 is a rear view of the installation shown in Fig. 1.
Figure 3:
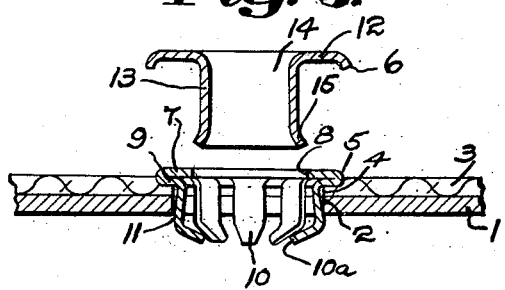
Fig. 3 is a sectional view along the line 3—3 of Fig. 1 showing the manner in which the bearing member is moved into locking engagement with the other parts of the installation.
Figure 4:
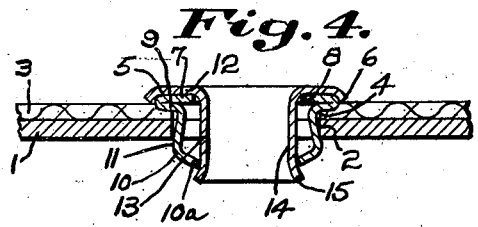
Fig. 4 is a sectional view taken along the line 3—3 of Fig. 1 with the bearing member in final locked position.
Figure 6:
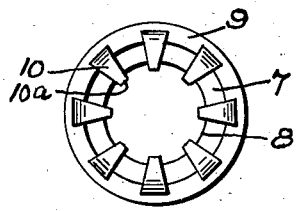
Fig. 6 is a bottom plan view of the fastener member shown in Fig. 5.
Figure 5:
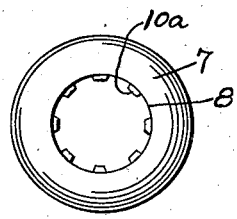
Fig. 5 is a top plan view of the fastener member used as a part of the installation.

My preferred form of installation, as shown in Figs. 1–4 of the drawing, comprises a support 1 which may be of metal or other material having a circular opening 2 therein. A piece of flexible material 3 covers the inner surface of the support 1 and has an opening 4 in alignment with the opening 2 of the support 1. The support 1 may be a portion of the roof of an automobile immediately adjacent the windshield (not shown) and the flexible material 2 may be the interior covering of the roof of the automobile. A fastener member 5 is disposed in snap fastener engagement with the support 1 through the opening 2 thereof and an article of manufacture such as the bearing member 6 is assembled in locked engagement with the fastener member 5 within the opening 2 of the support. The bearing member 6 provides a tubular bearing portion open at both ends for receiving a shaft (not shown) which may have a knob in the interior of the automobile and which extends from the knob through the bearing member 6 for engagement with any desired mechanism (not shown) such as that for actuating a windshield wiper (not shown).

Referring in detail to the fastener member 5, I have shown one having support-engaging means such as a base 7 which is preferably disposed, when the installation is in final assembly, outside the surface of the covering 3. The base 7 has a circular opening 8 therein in alignment with the axis of the fastener for a purpose to be described. A folded-under portion 9 is provided integral with the marginal edges of the base 7 and an annular series of yieldable fingers 10 extend from the free edges of the folded-under portion 9 away from the base 7. Each of the fingers 10 has a bowed construction so as to provide shoulder-like portions 11 for engagement with the material of the support adjacent the aperture 2. The free ends 10ª of the yieldable fingers 10 extend inwardly and form an imaginary circle at their innermost points which is of less diameter than the diameter of the opening 8 of the base for a purpose to be described.

The bearing member 6, which is preferably formed from one piece of metal, provides a flange portion 12 which is preferably of greater diameter than the diameter of the base 7 of the fastener member so as to overlie the base 7 when the parts of the installation are in final assembly to effect a neat appearance on the inside of the automobile. A bearing portion or shank 13 is pressed from the base 12 and provides a bore 14 which is open at both ends for receiving the hereinabove-mentioned actuating shaft. The shank 13 has an outwardly-flared portion 15 at its end away from the base 12 for cooperating with the free ends 10ª of the fingers 10 to lock the parts of the installation together in a manner to be described.

In assembling the parts of the installation together I first snap the fastener member 5 through the opening 2 of the support. During this action the folded-under portion 9 is drawn tightly against the covering material 3 through the drawing action which is set up by the particular bowed formation of the yieldable fingers 10. As a result of this construction the fastener member 5 serves to secure the material 2 firmly to the support whereby the covering material presents a smooth and unruffled appearance on the interior of the automobile. Next the shank 13 of the bearing member 6, which has a diameter greater than the diameter of the imaginary circle defined by the ends 10ª of the fingers 10, is moved through the opening 8 of the base 7 of the fastener member into engagement with the ends 10ª of the yieldable fingers. As pressure is exerted on the bearing member the yieldable fingers 10 are moved outwardly so as to lock the shoulders 11 in engagement with the material of the support 1 adjacent the aperture 2. At the same time the free ends 10ª of the fingers 10 engage behind the flared portion 15 of the shank 13 so as to prevent ready removal of the bearing member relative to the fastener member. It will be noticed that when the bearing member is in final fixed position the base 12 thereof is disposed in overlying adjacent relation to the base 7 of the fastener member.

Thus it will be seen that by my invention I have provided a simple and inexpensive means providing an efficient way for securing flexible covering material in tight relationship to a surface of the body of the automobile. Furthermore, my preferred installation effects an efficient, neat and easily assembled means for receiving an actuating shaft (not shown) which extends from the exterior of the automobile into the interior thereof.

The fastener installation hereinabove described has a variety of uses and for that reason I do not wish to be limited to the specific form of installation illustrated and described. Also, I do not wish to be limited by the particular construction of my preferred form of fastener member because it is apparent to those skilled in the art that the fastener member would be capable of efficiently carrying out the desired objects by relying on yieldable fingers for attaching the fastener to the support which do not have initial snap fastener action, but which are expanded to grip the walls of the support surrounding the aperture solely by engagement of the shank of the bearing member with the free end portions of the fingers.

Although I have illustrated and described a preferred embodiment of my invention, I do not wish to be limited thereby because the scope of my invention is best defined by the following claim.

I claim:

A device of the class described comprising a tubular support-engaging fastener member formed of resilient sheet material and adapted for insertion in and snap-fastener engagement with an apertured support, said fastener member being formed with a base and yieldable fingers extending from said base with portions adapted for snap-fastener engagement with the apertured support, said base being formed with an axial opening substantially smaller than the distance between support-engaging portions of opposed fingers, at least two of said fingers being inwardly bowed with their free ends separated a distance substantially less than the opening in said base, a second sheet metal part adapted for assembly with said fastener part after the latter has been assembled with the apertured support, said second part having a tubular shank and an outwardly flaring end adapted for camming engagement with said inwardly disposed finger ends providing a rearwardly facing shoulder against which said finger ends may be locked with the finger ends disposed against said rearwardly facing shoulder, said second part being formed with a flange at its other end contacting and overlying said fastener base, said flange and outwardly flared end of said second part engaging and contacting opposite ends of said fastener member and acting to prevent withdrawal of said second part from its assembled position with said fastener member and also resist flattening and flexing of the bowed fingers and accidental dislodgment of the fastener part from the apertured support.

CHARLES L. HALL.